(12) United States Patent
Bae

(10) Patent No.: US 12,338,333 B2
(45) Date of Patent: Jun. 24, 2025

(54) ELASTIC SULFONATED STYRENE DIENE BLOCK COPOLYMERS

(71) Applicant: RENSSELAER POLYTECHNIC INSTITUTE, Troy, NY (US)

(72) Inventor: Chulsung Bae, Cohoes, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 18/641,651

(22) Filed: Apr. 22, 2024

(65) Prior Publication Data
US 2024/0279413 A1 Aug. 22, 2024

Related U.S. Application Data

(62) Division of application No. 16/770,666, filed as application No. PCT/US2018/064258 on Dec. 6, 2018, now Pat. No. 11,987,679.
(Continued)

(51) Int. Cl.
C08J 5/22 (2006.01)
C08F 8/04 (2006.01)
(Continued)

(52) U.S. Cl.
CPC .......... C08J 5/2231 (2013.01); C08F 8/04 (2013.01); C08F 8/06 (2013.01); C08F 8/36 (2013.01);
(Continued)

(58) Field of Classification Search
CPC ......... C08J 5/2231; C08L 25/08; C08L 81/06; C08L 65/02; C08L 71/12; C08L 2312/00;
(Continued)

(56) References Cited

U.S. PATENT DOCUMENTS

2003/0065094 A1 4/2003 Nitta et al.
2009/0226791 A1 9/2009 Fuller et al.

FOREIGN PATENT DOCUMENTS

WO 2004034499 A2 4/2004

OTHER PUBLICATIONS

Hsu et al., Preparation, characterization, and properties of poly(styrene-b-sulfonated isoprene)s membranes for proton exchange membrane fuel cells (PEMCFCs), Journal of Membrane Science 484 (2015) 146-153 (Year: 2015).*

(Continued)

Primary Examiner — Robert D Harlan
(74) Attorney, Agent, or Firm — Barclay Damon LLP

(57) ABSTRACT

The electrochemical energy conversion system include an anode, a cathode, and a proton exchange membrane disposed between the anode and the cathode. The proton exchange membrane includes a polymer having a hard block polymer, a soft block polymer, and one or more hydrophilic functional groups attached to the soft block polymer. The glass transition temperature of the hard block polymer is higher than a glass transition temperature of the soft block polymer, such that the hard block polymer is non-elastic and the soft block polymer is elastic at a desired operating temperature. The hydrophilic functional groups are attached to the soft block polymer via a thiol-ene reaction to modify double bonds in the soft block polymer. The swellable functional groups are selectively connected to the soft domains of the block copolymers, so that when the membrane swells (under hydration or gas adsorption), the stress is effectively absorbed by the soft domain and the impact on overall mechanical properties is minor, resulting in more durable membranes.

9 Claims, 5 Drawing Sheets

Related U.S. Application Data

(60) Provisional application No. 62/595,726, filed on Dec. 7, 2017.

(51) Int. Cl.

| | |
|---|---|
| *C08F 8/06* | (2006.01) |
| *C08F 8/36* | (2006.01) |
| *C08F 36/06* | (2006.01) |
| *C08F 36/08* | (2006.01) |
| *C08K 5/37* | (2006.01) |
| *C08L 25/08* | (2006.01) |
| *C08L 53/02* | (2006.01) |
| *C08L 65/02* | (2006.01) |
| *C08L 71/12* | (2006.01) |
| *C08L 81/06* | (2006.01) |
| *H01M 8/1023* | (2016.01) |
| *H01M 8/1072* | (2016.01) |
| *H01M 8/1088* | (2016.01) |
| *H01M 8/10* | (2016.01) |

(52) U.S. Cl.
CPC .............. *C08F 36/06* (2013.01); *C08F 36/08* (2013.01); *C08K 5/37* (2013.01); *C08L 25/08* (2013.01); *C08L 53/025* (2013.01); *C08L 65/02* (2013.01); *C08L 71/12* (2013.01); *C08L 81/06* (2013.01); *H01M 8/1023* (2013.01); *H01M 8/1072* (2013.01); *H01M 8/1088* (2013.01); *C08L 2312/00* (2013.01); *H01M 2008/1095* (2013.01)

(58) Field of Classification Search
CPC ........ C08L 23/025; C08F 36/06; C08F 36/08; C08F 8/04; C08F 8/06; C08F 8/36; H01M 2008/1095; H01M 8/1023; H01M 8/1072; H01M 8/1088
See application file for complete search history.

(56) References Cited

OTHER PUBLICATIONS

International Search Report and The Written Opinion of the International Searching Authority, International Application No. PCT/US2018/064258, mailed Apr. 19, 2019.

Hsu, C.Y., et al., "Preparation, characterization, and properties of poly(styrene-b-sulfonated isoprene)s membranes for proton exchange membrane fuel cells (PEMFCs)," Journal of Membrane Science, vol. 484, pp. 146-153, Mar. 5, 2015.

Buonerba, A., et al., "Novel nanostructured semicrystalline ionomers by chemoselective sulfonation of multiblock copolymers of syndiotactic polystyrene with polybutadiene," RSC Advances, vol. 4, pp. 60158-60167, Nov. 5, 2014.

Wang, W., et al., "High Temperature Thermoplastic Elastomers Synthesized by Living Anionic Polymerization in Hydrocarbon Solvent at Room Temperature," Macromolecules, vol. 49, pp. 2646-2655, Mar. 30, 2016.

Hsu, H.M., et al., "The intensively enhanced conductivity of polyelectrolytes by amphiphilic compound doping," Polymer Chemistry, vol. 6, pp. 2717-2725, Feb. 9, 2015.

* cited by examiner

ELASTIC SULFONATED STYRENE DIENE BLOCK COPOLYMERS

CROSS REFERENCE TO RELATED APPLICATION(S)

This application is a divisional of U.S. Utility patent application Ser. No. 16/770,666, filed Jun. 8, 2020, which is a national stage filing of International Patent Application No. PCT/US2018/064258, filed Dec. 6, 2018, which claims the benefit of U.S. Provisional Application No. 62/595,726, filed Dec. 7, 2017, which is incorporated by reference as if disclosed herein in its entirety.

STATEMENT REGARDING FEDERALLY SPONSORED RESEARCH OR DEVELOPMENT

This invention was made with government support under grant nos. 1506245 and 1545857 awarded by the National Science Foundation and DE-SC0018441 awarded by the U.S. Department of Energy. The government has certain rights in the invention.

BACKGROUND

Proton conductivity of proton exchange membranes (PEMs) is affected primarily by two factors: (a) ion exchange capacity (IEC), which depends on the molar concentration of ionic groups in the polymer, and (b) ion mobility, which is related to transport properties within the polymer morphology. Increasing the IEC of a PEM enhances proton conductivity; however, PEMs with high IECs (e.g., >2.0 mequiv/g or mmol/g) typically show excessive water uptake and uncontrollable swelling, which negatively affect their mechanical stability. Thus, it has been suggested that the most effective way to increase the proton conductivity of a PEM is to create a favorable morphology with well-connected ionic channels while maintaining moderate IEC (e.g., 1.3-1.8 mequiv/g). Such morphologies can be formed in hydrophilic-hydrophobic block copolymer systems via self-assembly of ionic polymer domains.

To date, the development of most ion exchange polymer membrane materials (cationic and anionic) has relied on rigid polymers because of their good thermomechanical stability in dry states. However, elastic membranes with block copolymer nanostructure are more suitable for practical applications because they can better withstand the swelling and plasticization caused by water and gaseous molecules. Styrene-b-ethylene-r-butylene-b-styrene polymer is a well-studied thermoplastic triblock copolymer with nanoscale phase-separated morphologies due to the covalent bonds between two incompatible blocks—a hard polystyrene (PS) block and a soft poly(ethylene-r-butylene) block. The hard domains consisting of aggregations of PS (glass transition temperature=100° C.) provide rigid mechanical strength, whereas the soft domains from EB block can elongate when stretched by an external force. The phase-separated morphologies of SEBS have made it useful as a precursor material for block copolymer PEMs and have been investigated for PEM fuel cells. Typically, the aromatic rings of the PS block are modified by electrophilic sulfonation (using commonly either $H_2SO_4$ or $ClSO_3H$), affording SEBS-$SO_3H$. However, because water molecules near the sulfonate group 'plasticize' the PS blocks, the rigid block swells and can no longer act as a physical cross-linker. Thus, the good mechanical strength of SEBS-$SO_3H$ does not persist. Furthermore, as the PS block is a minor component in commercial SEBS (typically less than 20-25 mol % of total repeating unit), this sulfonation method gives maximum IEC less than 1.5 mequiv/g even if all aromatic rings of PS chain undergo sulfonation.

SUMMARY

Some embodiments of the disclosed subject matter are directed to a electrochemical energy conversion system including an anode, a cathode, and a proton exchange membrane disposed between the anode and the cathode. In some embodiments, the proton exchange membrane includes a polymer having a hard block polymer, a soft block polymer, and one or more hydrophilic functional groups on the soft block polymer, wherein a glass transition temperature of the hard block polymer is higher than a glass transition temperature of the soft block polymer. In some embodiments, the hard block polymer is non-elastic and the soft block polymer is elastic at a desired operating temperature of the proton exchange membrane. In some embodiments, the hydrophilic functional group is attached to the soft block polymer via a thiolene reaction to modify a double bond in the soft block polymer.

In some embodiments, the hard block polymer includes polystyrene, p-tert-butylstyrene, polysulfone, poly(phenylene oxide), poly(phenylene), or combinations thereof. In some embodiments, the soft block polymer is polybutadiene, polyisoprene, or combinations thereof. In some embodiments, the hydrophilic functional group is a sulfonate group. In some embodiments, the polymer includes the structure according to the following formula

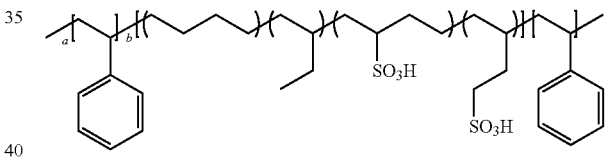

wherein a is about 20 mol % and b is about 80 mol %.

Some embodiments of the disclosure subject matter are directed to a method of making a proton exchange membrane material, including providing a reaction medium including a copolymer chain, the copolymer chain including a hard block polymer and a soft block polymer; attaching a functional group to the soft block polymer; saturating the soft block polymer; and oxidizing the functional group.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
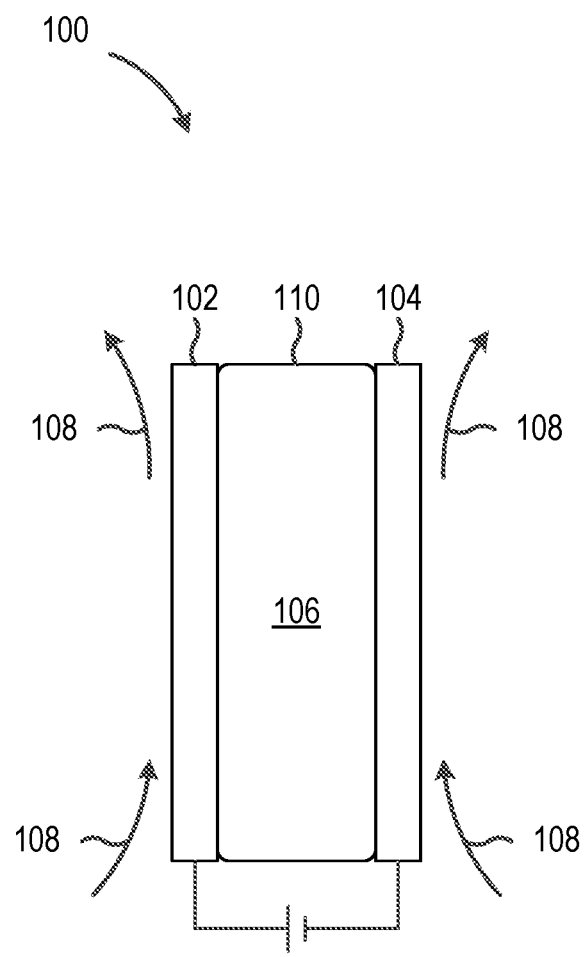
FIG. 1 is a schematic representation of an electrochemical energy conversion system including a proton exchange membrane according to some embodiments of the present disclosure.

Referring now to FIG. 1A, aspects of the disclosed subject matter include an electrochemical energy conversion system 100 comprising an anode 102, a cathode 104, and an electrolyte 106 disposed between the anode and the cathode. System 100 is suitable for use in numerous applications, such as fuel cells, energy recovery ventilation systems, water electrolysis systems, electrochemical hydrogen compressors, batteries, sensors, actuators, etc. In some embodiments, anode 102 and cathode 104 are composed of any suitable material for use with electrolyte 106 in system 100. In some embodiments, system 100 includes any inlets/outlets 108 to supply reactants to and remove reaction products from anode 102, cathode 104, and electrolyte 106. In some embodiments, system 100 includes a catalyst layer (not pictured).

In some embodiments, electrolyte 106 is a solid electrolyte. In some embodiments, electrolyte 106 is proton exchange membrane 110. Proton exchange membrane 110 includes a block copolymer composed of alternating hard and soft domains. In some embodiments, the block copolymer is composed of at least a first block polymer and at least a second block polymer. In some embodiments, the first block polymer is a hard block polymer. In some embodiments, the second block polymer is composed of a soft block polymer. In some embodiments, the block copolymer is composed of a plurality of substantially alternating hard block polymers and soft block polymers. In some embodiments, each hard block polymer in the block copolymer has the same composition. In some embodiments, the hard block polymers in the block copolymer have two or more different compositions. In some embodiments, each soft block polymer in the block copolymer has the same composition. In some embodiments, the soft block polymers in the block copolymer have two or more different compositions. In some embodiments, the block copolymers are crosslinked to other block copolymers, as will be discussed in greater detail below. In some embodiments, the soft block polymers make up at least 60 mol % of the block copolymer. In some embodiments, the soft block polymers make up at least 70 mol % of the block copolymer. In some embodiments, the soft block polymers make up at least 80 mol % of the block copolymer. In some embodiments, the soft block polymers make up at least 90 mol % of the block copolymer.

In some embodiments, the soft block polymer is functionalized with at least one polar group, e.g., an ionic group. In some embodiments, the at least one polar group is a hydrophilic functional group. In some embodiments, the soft block polymer includes a plurality of polar groups. In embodiments with a plurality of soft block polymers in the block copolymer, a plurality of soft block polymers are functionalized with at least one polar group. In some embodiments, proton exchange membrane 110 includes a polymer according to the following formula I:

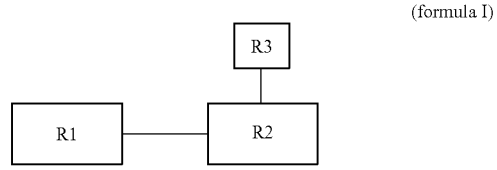

(formula I)

wherein R1 a hard block polymer, R2 is a soft block polymer, and R3 is or includes one or more hydrophilic functional groups.

As used herein, the terms "hard" and "soft" block polymers are used to mean that one block polymer is non-elastic (hard) and one block polymer is elastic (soft) at a desired operating temperature, e.g., room temperature, the operating temperature of a fuel cell, etc. In some embodiments, the hard block polymer has a glass transition temperature ($T_g$) that is higher than the glass transition temperature of the soft block polymer. In some embodiments, the overall $T_g$ of the plurality of hard block polymers in the block copolymer is higher than the overall $T_g$ of the plurality of soft block polymers in the block copolymer. In some embodiments, the hard block polymer has a $T_g$ above about 50° C. In some embodiments, the hard block polymer has a $T_g$ above about 75° C. In some embodiments, the hard block polymer has a $T_g$ above about 100° C. In some embodiments, the hard block polymer has a $T_g$ above about 150° C. In some embodiments, the hard block polymer includes polystyrene, p-tert-butylstyrene, polysulfone, poly(phenylene oxide), poly(phenylene), or combinations thereof. In some embodiments, the soft block polymer has a $T_g$ below about −0° ° C. In some embodiments, the soft block polymer has a $T_g$ below about −50° C. In some embodiments, the soft block polymer has a $T_g$ below about −100° C. In some embodiments, the soft block polymer includes a diene derivative. In some embodiments, the soft block polymer includes butadiene, isoprene, or combinations thereof.

In some embodiments, the polar group is attached to the block copolymer by chemical modification of a double bond in the soft block polymer. In some embodiments, the polar group is attached to the soft block polymer via a thiol-ene reaction to modify a double bond in the soft block polymer, as will be discussed in greater detail below. In some embodiments, the polar group is a sulfonate group, quaternary ammonium group, phosphonate group, alcohol, or combinations thereof. In some embodiments, the mol % of functionalized double bonds in the soft block polymer is above about 10%. In some embodiments, the mol % of functionalized double bonds in the soft block polymer is above about 20%. In some embodiments, the mol % of functionalized double bonds in the soft block polymer is above about 50%. In some embodiments, the mol % of functionalized double bonds in the soft block polymer is between about 10% and about 20%. In some embodiments, the mol % of functionalized double bonds in the soft block polymer is between about 20% and about 30%.

In some embodiments, the block copolymer is made from a styrene-b-butadiene-b-styrene polymer (SBS) precursor. In some embodiments, the block copolymer includes the structure according to formula II:

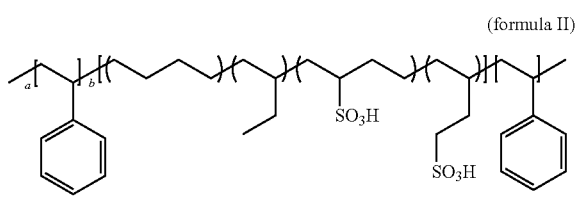

(formula II)

wherein a is about 10 mol % to about 30 mol % and b is about 70 mol % to about 90 mol %, and some of the double bonds in the soft block polymer have been chemically modified and sulfonate groups attached, while other double bonds in the soft block polymer are saturated. In some embodiments, a is about 20 mol % and b is about 80 mol %.

Figure 2A:
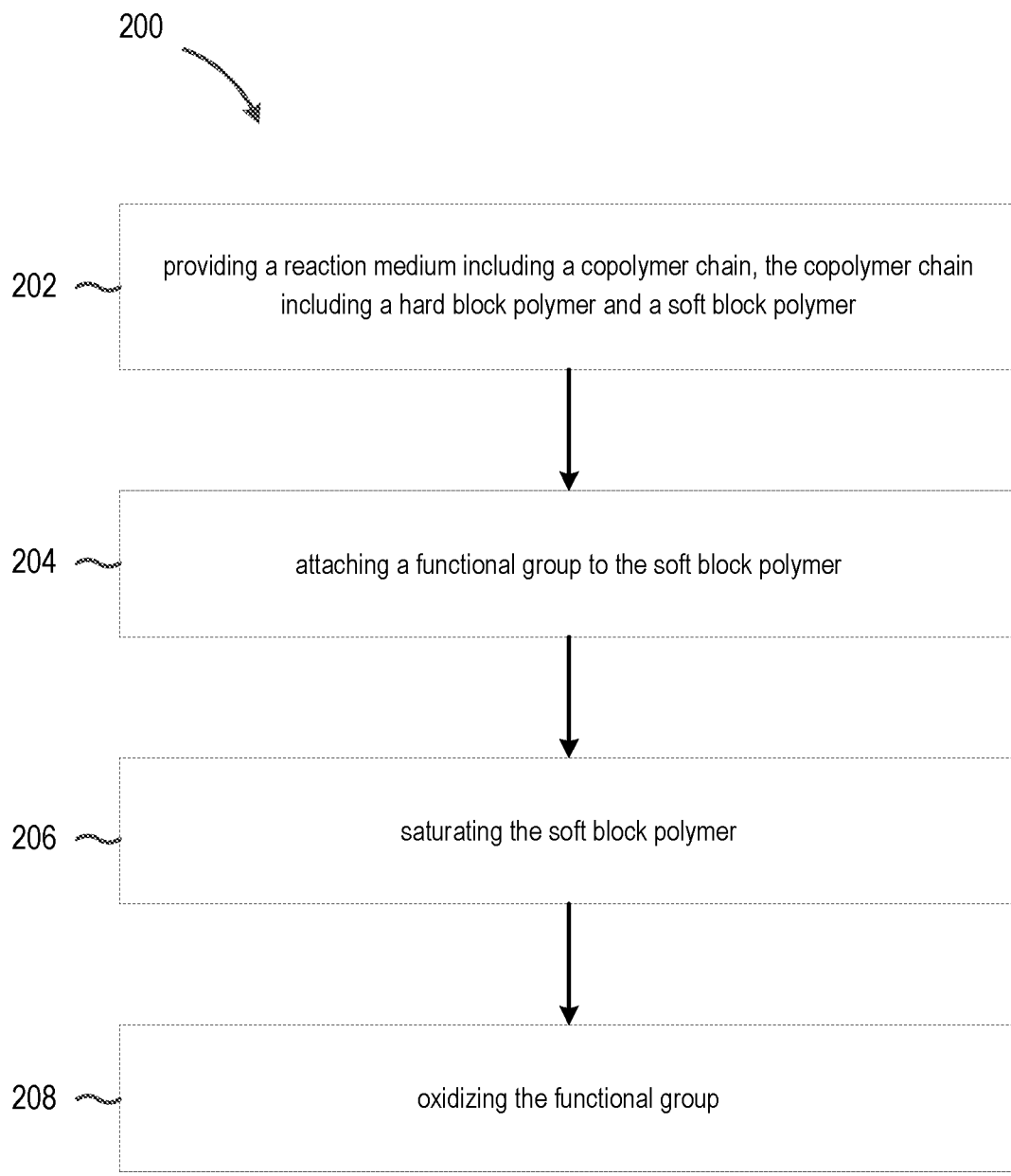
FIG. 2A is a chart of a method for making a proton exchange membrane according to some embodiments of the present disclosure.

Referring now to FIG. 2A, some aspects of the disclosed subject matter include a method 200 of making a proton exchange membrane material. At 202, a reaction medium is provided that includes a copolymer chain. As discussed above, in some embodiments, the copolymer chain includes a hard block polymer and a soft block polymer. At 204, one or more functional groups are attached to the soft block polymer. In some embodiments, the functional group is attached to the soft block polymer by performing a thiol-ene reaction to attach a thioester group to the soft block polymer (attachment of another functional groups, e.g., quaternary ammonium via an amination reaction, is also contemplated by the present disclosure). At 206, the soft block polymer is saturated to remove double bonds therein. In some embodiments, the soft block polymer is saturated 206 via hydrogenation of the C=C bonds in the soft block polymer. In some embodiments, the soft block polymer is saturated 206 by crosslinking the block copolymer chain with other block copolymer chains. In some embodiments, the block copolymer chain is both hydrogenated and crosslinked. At 208, the functional group is oxidized. In some embodiments where the functional group is a sulfonate, the functional group is oxidized 208 by oxidizing the sulfur of a thioester group.

EXAMPLE

Figure 2B:
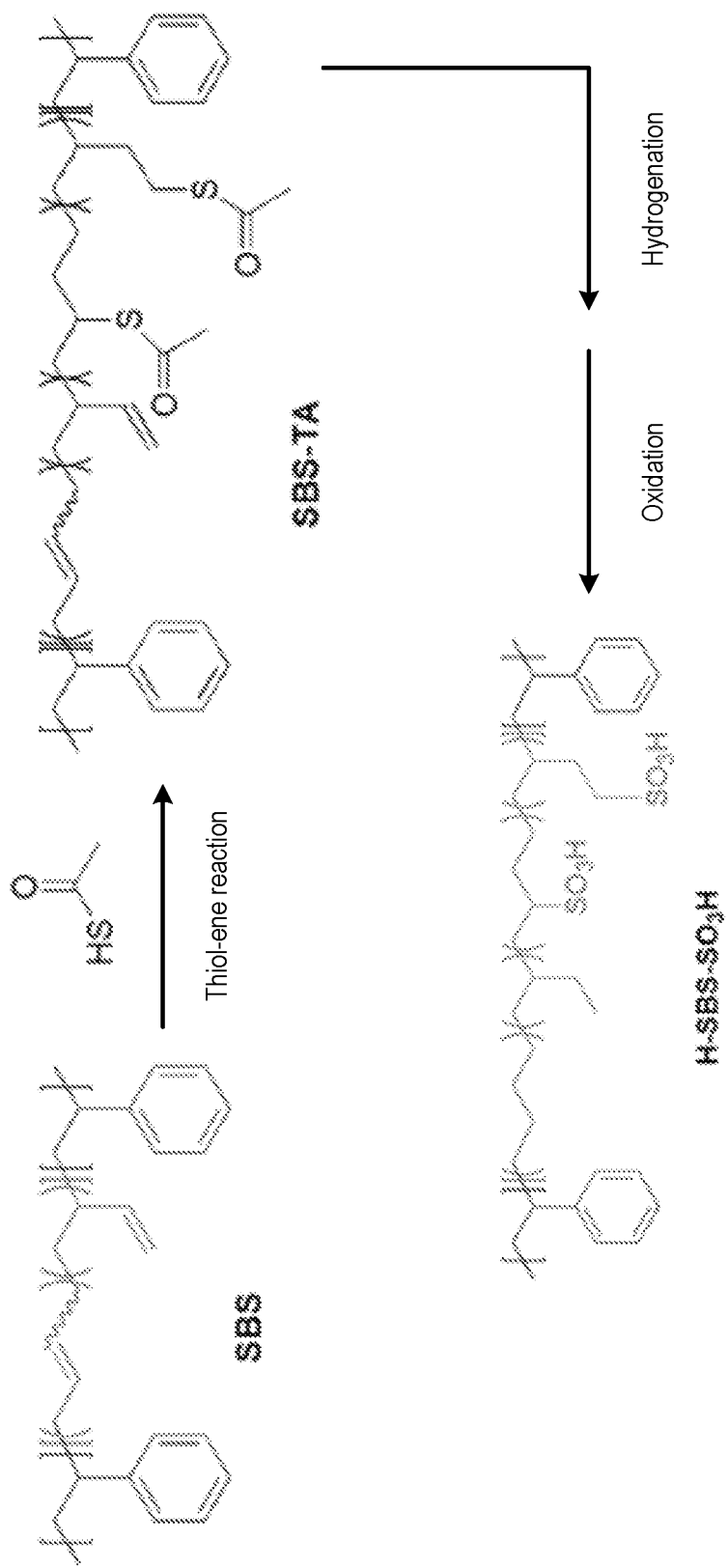
FIG. 2B is a chart showing reactions for making a proton exchange membrane according to some embodiments of the present disclosure.
Figure 2C:
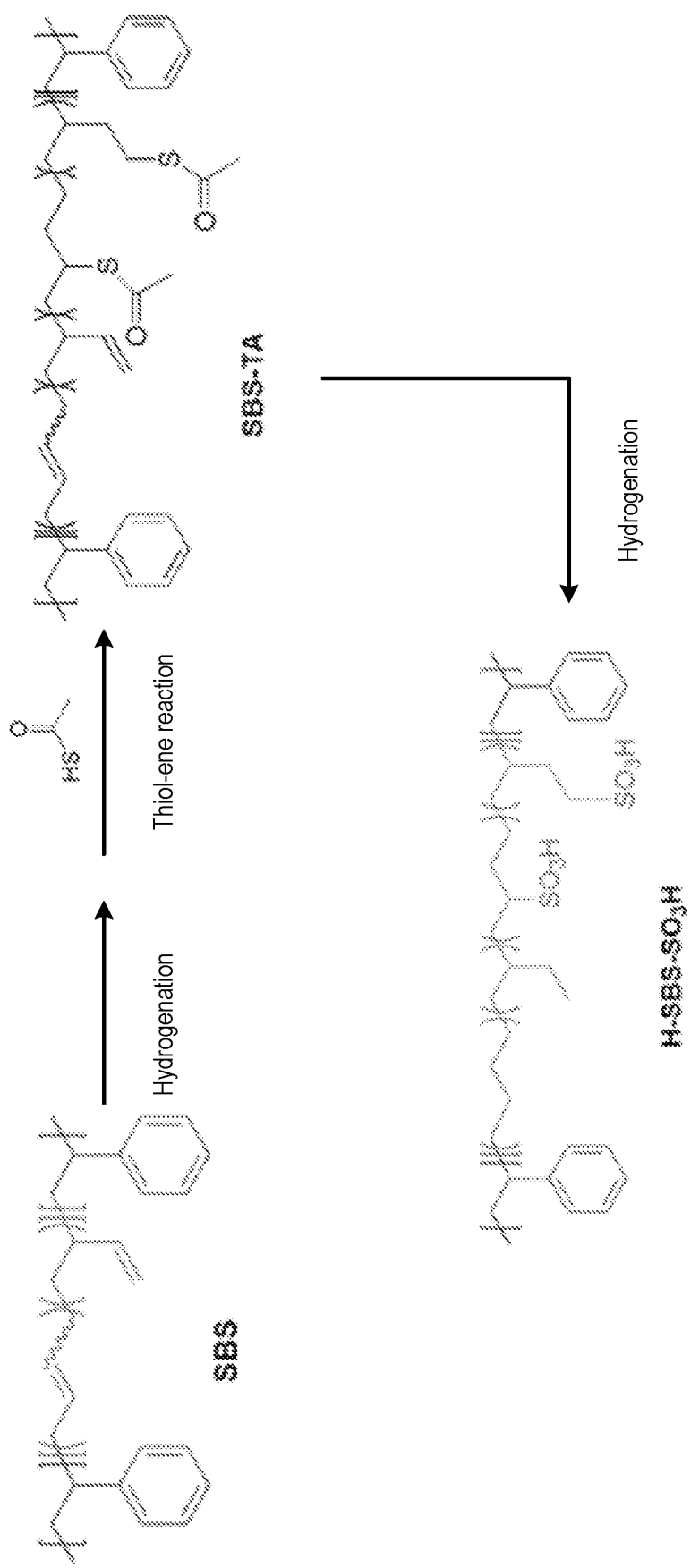
FIG. 2C is a chart showing reactions for making a proton exchange membrane according to some embodiments of the present disclosure.
Figure 2D:
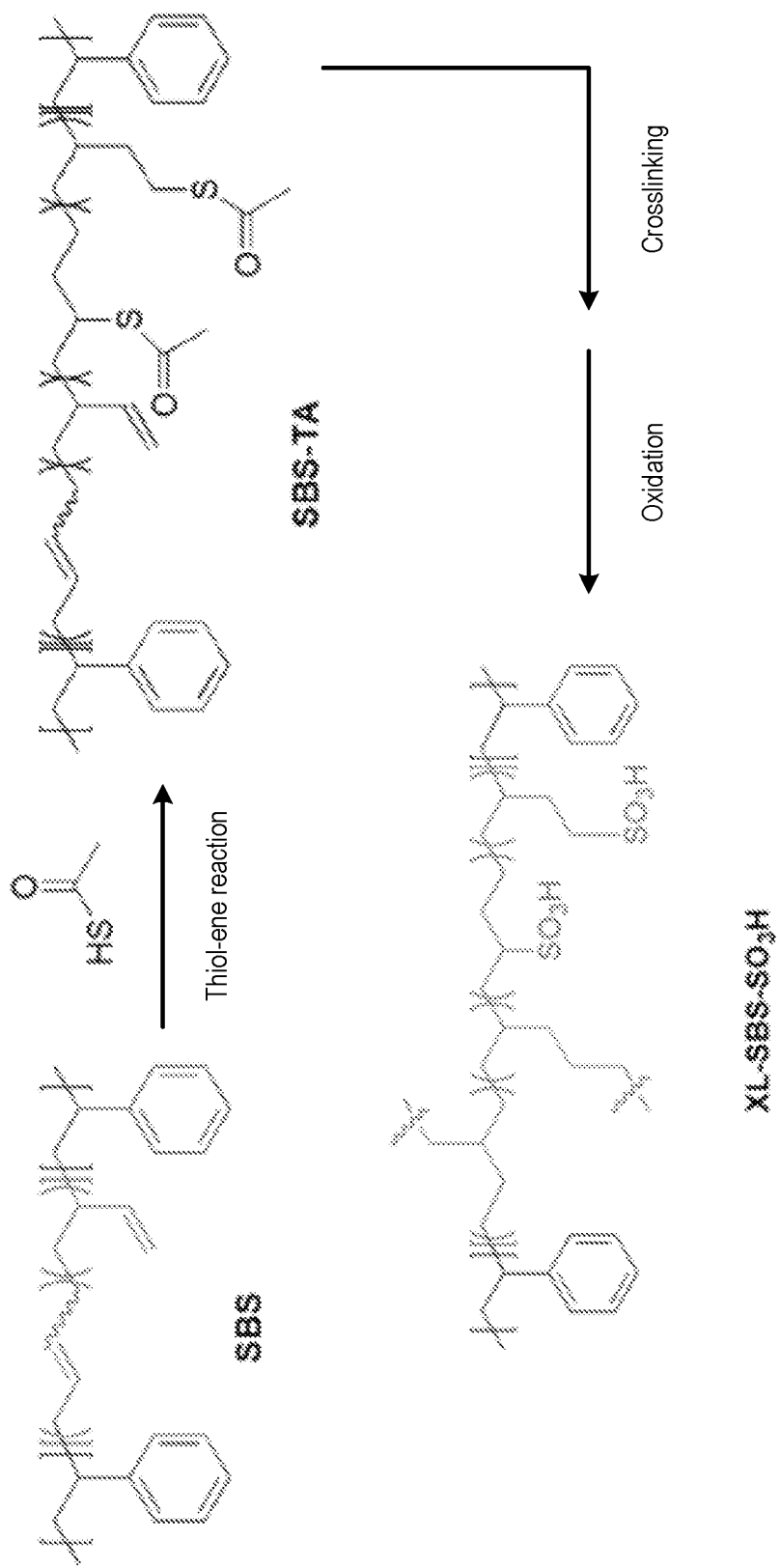
FIG. 2D is a chart showing reactions for making a proton exchange membrane according to some embodiments of the present disclosure.

Referring now to FIGS. 2B-2D, preparation of a proton exchange membrane material from a styrene-b-butadiene-b-styrene polymer (SBS) as a precursor polymer is shown. Referring now to FIG. 2B, in some embodiments, the functional group is attached to the soft block polymer by performing a thiol-ene reaction to attach a thioester group to the soft block polymer (SBS-TA). The soft block polymer is then saturated via hydrogenation of the C=C bonds in the soft block polymer and the functional group is oxidized by oxidizing the sulfur of the thioester group. Referring now to FIG. 2C, in some embodiments, the soft block polymer is first saturated via hydrogenation of the C=C bonds in the soft block polymer and then the functional group is attached to the soft block polymer by performing a thiol-ene reaction to attach a thioester group to the soft block polymer (H-SBS-TA). The functional group is then oxidized by oxidizing the sulfur of the thioester group. The reactions of FIGS. 2B and 2C each give the same sulfonated product H—SBS-SO$_3$H. Referring now to FIG. 2D, in some embodiments, the soft block polymer is saturated by crosslinking the block copolymer chain with other block copolymer chains. Crosslinking followed by oxidations of the thioester groups provides a mechanically more stable crosslinked polymer XL-SBS-SO$_3$H.

Methods and systems of the present disclosure advantageously provide a variety of polar groups (including ionic groups) to the soft domains of nanostructured block copolymers. Selective functionalization of the soft block polymer chains with ionic groups does not disrupt the assembly behaviors of the hydrophobic rigid domain, so any mechanical effects on the membrane are minimal. Further, because the swellable polar groups are connected to the soft domains of the block copolymers, when the membrane swells (under hydration or gas adsorption), the stress is effectively absorbed by the soft domain and the impact on overall mechanical properties is minor, resulting in more durable membranes. The materials used in the present disclosure are inexpensive, allowing the membranes to be manufactured at reduced cost. Finally, the membranes according to the present disclosure have a wide range of uses, including electrochemical energy conversion such as fuel cells and selective permeation membranes for polar molecules such as $CO_2$, water, and alcohol.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of making a proton exchange membrane material, the method comprising:
    providing a reaction medium including a copolymer chain, the copolymer chain including a hard block polymer and a soft block polymer;
    attaching a functional group to the soft block polymer;
    saturating the soft block polymer; and
    oxidizing the functional group,
    wherein the material includes the structure according to formula II:

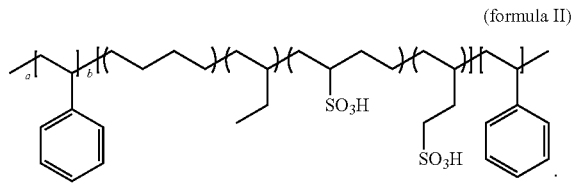

(formula II)

2. The method according to claim 1, wherein attaching a functional group to the soft block polymer includes:
    performing a thiol-ene reaction to attach a thioester group to the soft block polymer.

3. The method according to claim 1, wherein saturating the soft block polymer includes:
    hydrogenating the soft block polymer;
    crosslinking the copolymer chain with other copolymer chains;
    or combinations thereof.

4. The method according to claim 1, wherein the glass transition temperature of the hard block polymer is higher than a glass transition temperature of the soft block polymer.

5. The method according to claim 4, wherein the mole % of modified double bonds in the soft block polymer is above about 10%.

6. The method according to claim 5, wherein the mole % of modified double bonds in the soft block polymer is between about 10% and about 20%.

7. The method according to claim 1, wherein a glass transition temperature of the hard block polymer is greater than or equal to 100° C.

8. The method according to claim 2, wherein oxidizing the functional group includes:

oxidizing the sulfur of the thioester group to a sulfonate.

9. The method according to claim 8, wherein a is about 20 mol % and b is about 80 mol %.

\* \* \* \* \*